July 4, 1939. A. E. BRIDGE 2,164,445
PAPER MACHINERY
Filed Dec. 5, 1935 2 Sheets-Sheet 1
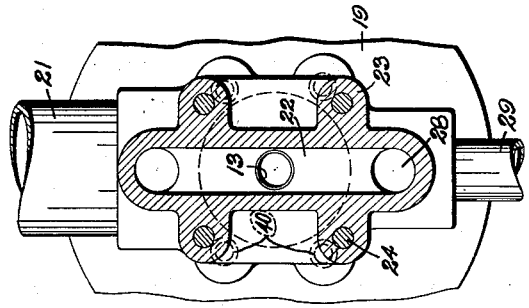
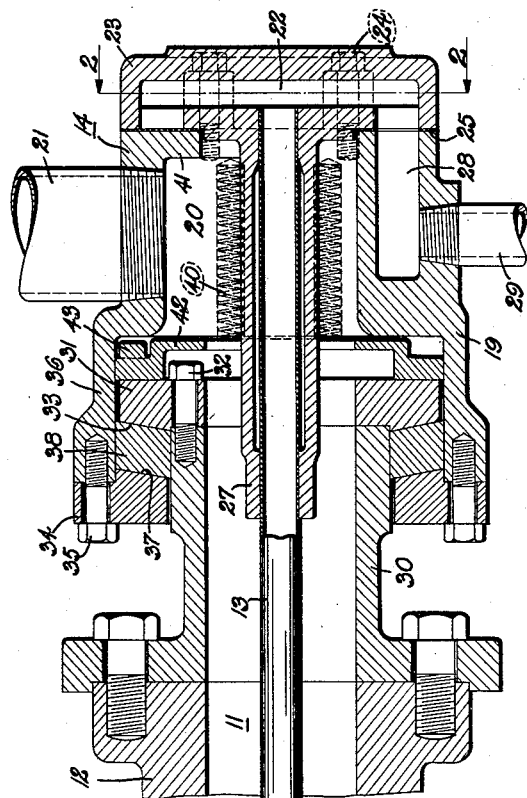
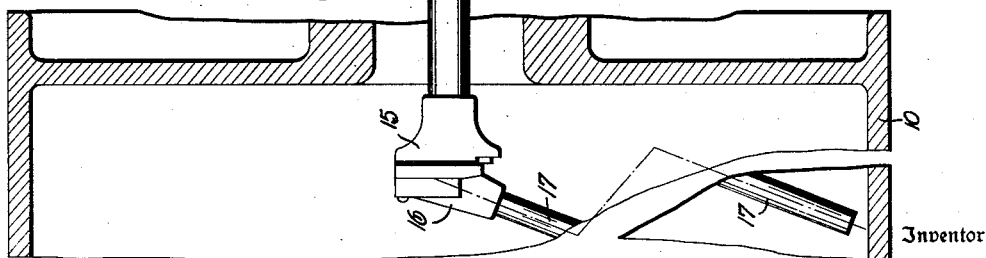
Inventor
Adam E. Bridge
Maréchal + Noé
Attorney July 4, 1939.  A. E. BRIDGE  2,164,445
PAPER MACHINERY
Filed Dec. 5, 1935   2 Sheets-Sheet 2
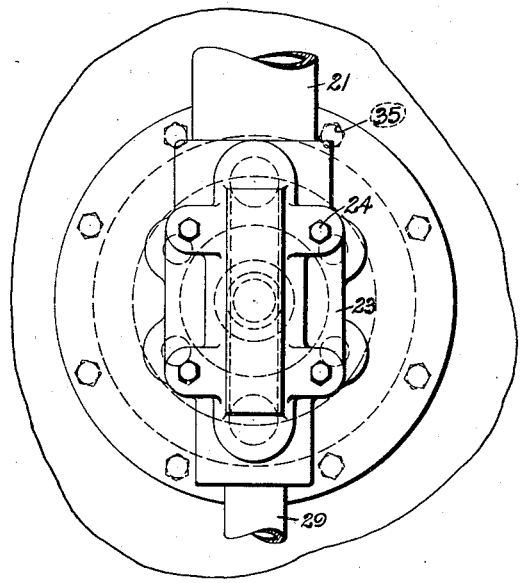
*Fig.3*
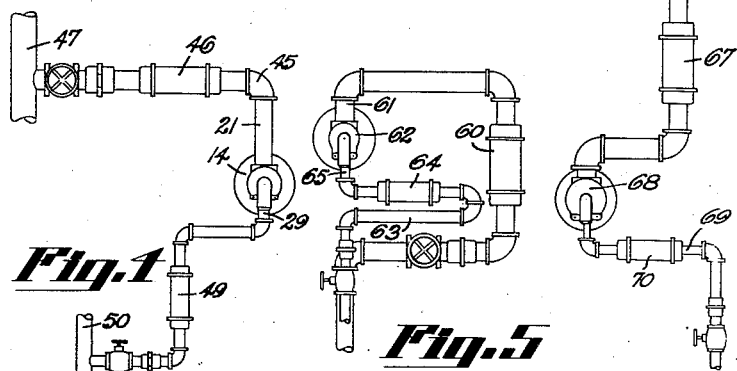
*Fig.1*   *Fig.5*   *Fig.6*
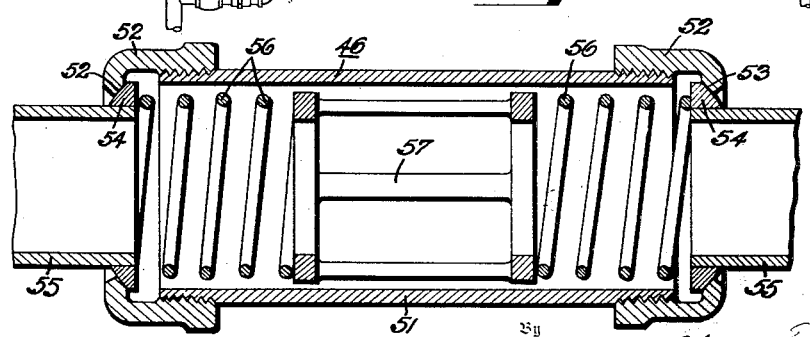
*Fig.7*
Inventor
Adam E. Bridge
Mareschal & Noe
Attorney Patented July 4, 1939

2,164,445

UNITED STATES PATENT OFFICE 2,164,445

PAPER MACHINERY

Adam E. Bridge, Franklin, Ohio, assignor to The Black-Clawson Company, Hamilton, Ohio, a corporation of Ohio Application December 5, 1935, Serial No. 53,026

3 Claims. (Cl. 285—10)

This invention relates to hollow drier rolls and to the removal of condensate therefrom.

One object of the invention is the provision of a condensate removal device for hollow rotatable rolls of a paper making machine or the like, incorporating a steam supply fitting which is mounted exactly in co-axial relationship on the roll journal shaft and held in such relationship by the steam pressure supplied to the fitting so that the expansion and contraction effects of the steam supply pipe does not disturb the setting or positioning of the condensate removal pipe which is carried by the fitting, and which extends down to a low point within the roll.

Another object of the invention is the provision of a condensate removal device of the character mentioned incorporating a steam fitting which is positioned axially on the roll journal independently of the steam supply pipe and the condensate removal pipe which are attached to the fitting.

Another object of the invention is the provision of a steam supply fitting which is supported on the end of a hollow journal roll shaft and which serves for the support of a condensate removal pipe extending to a low point within the roll, the pipe which supplies steam to the fitting and the pipe which withdraws condensate from the fitting having movable or jointed portions arranged to prevent pipe expansion from disturbing the axial location of the fitting although restraining the fitting against rotation.

Another object of the invention is the provision of a steam supply fitting which is supported at the end of a hollow journal roll shaft and serves for the support of a condensate removal pipe extending to a low point within the roll, the journal shaft having an outwardly extending flange which is enclosed by the steam fitting and which is normally held in steam-tight relation with the fitting by the pressure of the steam, the fitting also enclosing springs serving to hold the flange and fitting engaged with one another in the absence of any steam pressure.

Other objects and advantages of the invention will be apparent from the following description, the appended claims and the accompanying drawings, in which—

Fig. 1 is a vertical section of a portion of a hollow drier roll provided with a steam fitting in accordance with the present invention;

Fig. 2 is a vertical section on the line 2—2 of Fig. 1;

Fig. 3 is an end view of the steam supply fitting;

Fig. 4 is an end elevation showing the connections of the steam supply and condensate withdrawal pipes;

Fig. 5 is a view corresponding to Fig. 4 but showing a modified arrangement of the piping;

Fig. 6 is a further modification of the invention showing another arrangement of the piping; and Fig. 7 is a section, on an enlarged scale, of one of the flexible pipe portions.

Referring more particularly to the drawings by reference numerals, 10 represents a hollow rotatable drier of a paper machine or the like. The roll is heated by steam, which is supplied through the passage 11 provided in the hollow journal shaft portion 12 which extends axially at one end of the roll as shown in Fig. 1. This journal shaft is rotatably supported by any suitable bearing arrangement, and a suitable shaft and bearing are also provided for the other end of the roll, although preferably only one end of the roll is arranged for the supply of steam to the roll interior.

The condensed steam is continuously withdrawn from the interior of the roll by means of a condensate withdrawal passage including the suction pipe 13, one end of which is supported by a steam supply fitting which is designated generally by reference numeral 14. This pipe 13 projects centrally within the steam supply passage 11 and within the roll is provided with a depending extension pipe 17 the lower end of which is spaced only a little distance from the bottom of the roll. Cooperating connecting members 15 and 16 join the pipes 13 and 17 together in a pressure-tight manner under operating conditions, the members 15 and 16 being constructed preferably in accordance with my prior application Serial No. 714,963 filed March 10, 1934, now Patent 2,056,562, so that the pipe extension 17 can be swung up to axial alignment with the pipe 13 when the latter is removed endwise from the roll, and also providing for limited swinging of the extension pipe 17 about the axis of pipe 13.

It has been the usual practice to so arrange the steam supply fitting on the roll shaft as to permit relative axial tilting of the steam supply fitting with respect to the axis of the roll shaft when expansion or contraction takes place in the steam supply pipe that extends to the fitting, a spherical bearing or connection being provided between the rotatable shaft and the stationary steam supply fitting. With such a construction, in the absence of any provision which definitely locates the fitting against angular tilting into misalignment with the journal axis, the syphon pipe through which the condensate is removed from the roll, being carried by the steam supply fitting, is axially displaced or tilted with respect to the roll axis, and the lower depending portion of the suction pipe is not accurately located. In accordance with the present invention, however, the spherical packing or seat surface is not used, and instead, there is provision on the steam supply fitting which bears against a shoulder portion extending outwardly from the journal shaft in such a way that the steam supply fitting is definitely and accurately located in alignment with the journal shaft axis at all times. And as the condensate withdrawal pipe is fixed on the steam supply fitting it will be apparent that the horizontally extending part of the condensate withdrawal pipe is very accurately positioned regardless of any expansion or contraction effect of the steam supply or condensate withdrawal pipes which are, of course, subjected to extremely high temperature changes.

As shown in Fig. 1, the steam supply fitting 14 comprises a casting 19 having a steam chamber 20, the steam being supplied through a short steam pipe 21 which is threaded into the fitting casting 19. The steam supplied to the chamber 20 passes through the passage 11 into the interior of the roll, as will be readily apparent, the condensate being withdrawn, by suction, up through the suction pipe extension 17 and then through the pipe 13 into the condensate chamber 22 which is in communication with the end of pipe 13 and which is provided in a separate cap portion 23 secured as by means of screws 24 to the casting 19. The inner ends of these screws 24 are threaded into the casting 19 and hold the cap 23 against the gasket 25. Projecting inwardly from the cap 23 and integral therewith is an elongated rigid shell 27 closely engaging the outside of the pipe 13 at relatively distant points, the shell 27 and pipe 13 being connected as by means of welding. The condensate, which is drawn into the chamber 22, is withdrawn from the fitting through a channel 28 and taken off through the condensate withdrawal pipe 29 which preferably extends in alignment with the steam supply pipe 21.

The steam supply fitting 14 is carried on the roll shaft portion 30, the latter having a flange or plate 31 secured thereto as by means of bolts 32 and providing a shoulder 33 which extends outwardly from the shaft axis, either at 90° from the shaft axis or at some suitable angle of inclination as shown in Fig. 1 giving a flat or frustoconical surface. The steam supply fitting 14 is provided with a plate 34, suitably fixed in place by means of bolts 35 or the like, the plate 34 together with the wall 36 on which it is supported serving to enclose the shoulder 33 and the flange 31 of the journal shaft portion 30. Arranged between the shoulder 33 and the inner surface 37 of plate 34 is a suitable packing material 38, preferably in the form of a rigid packing ring both sides of which are either flat or frustoconical in accordance with the surfaces with which they engage. This ring acts both as a steam seal and a thrust bearing, and prevents direct frictional engagement between the surfaces 33 and 37. The inner cylindrical surface of the plate 34 is a suitable clearance distance away from the rotatable shaft portion 30, and the flange 31 on the latter is also spaced inwardly of the wall 36. The fitting, however, is definitely located so that its axis is always in exact alignment with the axis of the journal shaft, since the pressure of the steam within the chamber 20 acts to urge the entire fitting towards the right and thus hold the plate 34 and the packing 38 tightly between the surfaces 33 and 37 preventing any loss of steam at this point and definitely locating the stationary fitting and the journal shaft in axial alignment with one another at all times during operation.

These parts are also yieldingly held in axial alignment by means of coil springs 40 which bear at their right-hand ends against the inwardly extending flange portion 41 of the fitting, and at their opposite ends engage a disk 42 bearing against the end of the flange plate 31. The disk 42 is preferably held against rotation by means of a lug 43 provided thereon and engaging a suitable projection on the wall 36 of the fitting. The steam supply fitting is thus held in its proper position on the roll shaft in a yielding manner even in the absence of any steam pressure. The springs 40 are arranged within the steam chamber 20 and thus subjected to the heat of the steam but this is not a particular disadvantage because these springs are entirely unnecessary during operating conditions as the steam pressure at that time holds the fitting in its proper position and thus maintains the suction pipe 13 exactly in alignment with the shaft axis. As will be apparent, merely by removing the bolts or screws 24 and then moving the cap 23 to the right, the entire suction pipe can be withdrawn without disturbing the position of the fitting casting 19 and without disconnecting either the water or steam supply pipes which connect to the fitting.

The steam supply pipe 21 is connected to the fitting 14 in such a manner as to hold the fitting against rotating with the journal shaft, while expansion and contraction of the steam supply pipe is prevented from disturbing the axial location of the fitting on the shaft. As shown in Fig. 4, the steam supply pipe 21 is connected through an elbow 45 to a flexibly jointed pipe portion 46 which extends preferably at right angles to pipe 21 and at right angles to the steam supply header 47. As the pipe 21 is quite short in length its expansion and contraction has no effect tending to change the axial alignment of the fitting on the shaft, as the elbow 45 can move up and down freely. And any elongation of the flexible pipe portion 46 in a horizontal direction has no effect tending to disturb the axial position of the fitting on the shaft, its only effect being to cause a negligible relative turning of the fitting on its own axis which is, of course, entirely unobjectionable. The fitting is thus prevented from rotating and any expansion effect of the steam supply pipe which is, of course, subjected to very large temperature changes, is prevented from disturbing the axial alignment of the fitting and thus prevented from disturbing the accurate positioning of the suction withdrawal pipe so that its lower end can project down far enough into the condensate without rubbing against the wall of the roll.

The condensate withdrawal pipe 29 is also arranged so that its expansion and contraction has no effect on the axial location of the fitting on the journal shaft, this pipe also having a flexibly jointed portion 49 which, as will be noted, extends angularly and preferably at 90° to the flexibly jointed portion 46 of the steam supply pipe, and parallel to the pipe portion 29 and to the vertical return header 50.

The flexibly jointed portions 46 and 49 of the steam supply pipe and of the suction or withdrawal pipe, respectively, are preferably constructed as shown in Fig. 7 in which the pipe portion 46 is illustrated. This portion 46 preferably comprises a tube 51 in threaded engagement with end caps 52 which are provided with spherically curved portions 53 engaging the spherical seat members 54 fixed on the ends of the pipe portions 55. The steam pressure seals the seat members 53 under operating conditions, but compression springs 56 and a spacing member 57 are also provided to hold the pipe portions 55 against the end caps 52 although permitting any angular adjustment or misalignment of the axes of pipe portions 55.

Fig. 5 shows a modified arrangement of the steam supply and condensate withdrawal pipes, in which the flexible pipe portion 60 is arranged vertically instead of horizontally and is parallel to the pipe portion 61 that leads upwardly from the fitting 62. The condensate withdrawal pipe 63 is provided with a flexible pipe portion 64 arranged horizontally and at right angles to the downwardly extending pipe portion 65 leading from the fitting 62, and also at right angles to the flexible pipe portions 60 of the steam supply pipe.

Fig. 6 shows a further modification of the invention in which the flexible pipe portion 67 in the steam supply pipe extends upwardly to a header provided above the fitting 68, the condensate withdrawal pipe 69 extending downwardly from the fitting and having a flexible pipe portion 70 which is arranged at right angles to the flexible portion 67 of the steam supply pipe. In this construction as in the forms of construction shown in Figs. 4 and 5, the flexible connection of the steam supply pipe is arranged at about 90° to the flexible connection in the condensate withdrawal pipe so that expansion and contraction effects of either of these pipes will not interfere with the axial location of the fitting with respect to the journal shaft as determined by the engaging bearing surfaces on those parts.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. In combination, a hollow rotatable roll having a hollow journal shaft providing communication to the interior of the roll, a stationary steam supply fitting having a steam supply chamber in communication with the passage in the journal shaft, a condensate withdrawal means in said passage supported by said fitting and having an extension reaching to a low point within the roll, a pipe for withdrawing condensate from said fitting, said shaft having a shoulder extending outwardly from the shaft axis and providing an abutment face facing toward the roll, said fitting enclosing said shoulder and having an abutment face facing away from the roll, packing between said shoulder and fitting and normally held compressed by the pressure of the steam supplied to said fitting the packing having a conical abutment surface interfitting with one of said faces, said shoulder packing and fitting maintaining the fitting coaxially with the shaft, spring means holding the shoulder and fitting yieldingly in bearing relation with one another, and means for supplying steam to said fitting.

2. In combination, a hollow rotatable roll having a hollow journal shaft providing communication to the interior of the roll, a stationary steam supply fitting having a steam supply chamber in communication with the passage in the journal shaft, a condensate withdrawal means in said passage supported by said fitting and having an extension reaching to a low point within the roll, said shaft having a shoulder extending outwardly away from the shaft axis and enclosed by said fitting, rigid packing between the shoulder and the fitting and normally held compressed by the pressure of the steam supplied to the fitting, said shoulder having a face facing toward the roll and in the direction of the shaft axis and said fitting having a cooperating face, said packing being located between the shoulder and fitting faces and having non-spherical faces cooperating with the faces of the shoulder and fitting to prevent any misalignment of the central axis of the fitting with respect to the shaft axis, and spring means enclosed within the fitting and normally holding the fitting and shaft shoulder yieldingly against said packing.

3. In combination, a hollow rotatable roll having a hollow journal shaft providing communication to the interior of the roll, a stationary steam supply fitting having a steam supply chamber in communication with the passage in the journal shaft, a condensate withdrawal means in said passage supported by said fitting and having an extension reaching to a low point within the roll, said shaft having a shoulder extending outwardly away from the shaft axis and enclosed by said fitting, packing between said fitting and the side of the shoulder facing toward the roll and normally held compressed by the pressure of the steam supplied to the fitting to seal the steam supply chamber against steam leakage, spring means enclosed in said steam supply chamber acting outwardly on the end of the fitting remote from the roll and normally holding said fitting and shaft shoulder against said packing, and a pressure plate in said fitting engaged by the other end of said spring means said pressure plate being held against movement toward the roll by said shoulder, and means on said fitting for holding said pressure plate against rotation.

ADAM E. BRIDGE.